United States Patent [19]

Combes

[11] Patent Number: 5,830,814
[45] Date of Patent: Nov. 3, 1998

[54] GLASS COMPOSITIONS FOR THE MANUFACTURE OF GLAZINGS

[75] Inventor: Jean-Marie Combes, Paris, France

[73] Assignee: Saint-Gobain Vitrage, Aubervilliers Cedex, France

[21] Appl. No.: 740,913

[22] Filed: Nov. 5, 1996

Related U.S. Application Data

[63] Continuation of Ser. No. 284,658, Nov. 3, 1994, abandoned.

[30] Foreign Application Priority Data

Dec. 23, 1992 [FR] France .................. 92 15537

[51] Int. Cl.$^6$ .................................. C03C 3/087
[52] U.S. Cl. ................ 501/70; 501/64; 501/57; 501/72
[58] Field of Search ................ 501/57, 70, 71, 501/72, 64

[56] References Cited

U.S. PATENT DOCUMENTS

| | | | |
|---|---|---|---|
| 2,902,377 | 9/1959 | Duncan ........................ | 501/57 |
| 3,294,556 | 12/1966 | Harrington . | |
| 3,561,985 | 2/1971 | Hagedorn et al. ............ | 501/71 |
| 3,652,303 | 3/1972 | Janakirama-Rao .......... | 501/70 |
| 3,723,142 | 3/1973 | Kato et al. ................... | 501/71 |
| 3,837,831 | 9/1974 | Moore .......................... | 501/70 |
| 4,792,536 | 12/1988 | Pecoraro et al. ............. | 501/70 |
| 5,013,487 | 5/1991 | Cheng ......................... | 501/70 |
| 5,069,826 | 12/1991 | Cheng ......................... | 501/70 |
| 5,077,133 | 12/1991 | Cheng ......................... | 501/70 |
| 5,240,886 | 8/1993 | Gulotta et al. ............... | 501/70 |
| 5,318,931 | 6/1994 | Nakaguchi et al. .......... | 501/70 |
| 5,344,798 | 9/1994 | Morimoto et al. ............ | 501/70 |

FOREIGN PATENT DOCUMENTS

| | | | |
|---|---|---|---|
| 469446 | 2/1992 | European Pat. Off. . | |
| 0215546 | 10/1985 | Japan .......................... | 501/70 |
| 0443004 | 9/1974 | U.S.S.R. ..................... | 501/70 |
| 1151521 | 4/1985 | U.S.S.R. ..................... | 501/71 |
| 9107356 | 5/1991 | WIPO . | |

OTHER PUBLICATIONS

*Chemical Abstracts* vol. 74, No. 12, Mar. 71, Schleifer et al.

*Primary Examiner*—Karl Group
*Attorney, Agent, or Firm*—Oblon, Spivak, McClelland, Maier & Neustadt, P.C.

[57] ABSTRACT

The present invention relates to glass compositions suitable for the manufacture of glazings for use in the architectural field or for fitting in motor vehicles. These compositions contain the following constituents with the contents, express in weight percentages, defined by the following limits:

$SiO_2$ 69 to 75%
$Al_2O_3$ 0 to 3%
CaO 2 to 10%
MgO 0 to 2%
$Na_2O$ 9 to 17%
$K_2O$ 0 to 8%
$Fe_2O_3$ (total iron) 0.2 to 1.5%

These compositions can also contain fluorine, as well as oxides of zinc, zirconium, carium, titanium and less than 4% barium oxide, the sum of the percentages of the alkaline earth oxides remaining equal to or below 10%.

19 Claims, No Drawings

GLASS COMPOSITIONS FOR THE MANUFACTURE OF GLAZINGS

This application is a Continuation of application Ser. No. 08/284,658, filed on Nov. 3, 1994, now abandoned, which was originally filed as International Application No. PCT/FR93/01292, filed on Dec. 22, 1993.

BACKGROUND OF THE INVENTION

1. Field of the Invention

The present invention relates to glass compositions suitable for the manufacture of glazings which can more particularly be used in the architectural field or for installation in motor vehicles.

2. Description of the Background

Glazings for the latter application must satisfy legal requirements concerning their light transmission. Thus, a glazing for use as a windscreen-must have a total light transmission factor under illuminant A ($TL_A$) at least equal to 75%. Glazings used for side and rear windows must have, under the same conditions, a factor $TL_A$ of at least 70%.

The glazed surface of motor vehicles is at present very large, so that customers are making even greater demands with respect to comfort, so that car designers are seeking all possible means for allowing a reduction of the heat sensation felt by passengers subject to solar radiation. One of the means consists of using glazings with a total energy transmission factor ($T_E$) which is as low as possible.

To maintain a high light transmission in the visible part of the spectrum, whilst absorbing to the greatest possible extent the remainder of the solar energy, it is known to introduce iron into the composition of the glass. Iron is present in the glass both as ferric oxide ($Fe_2O_3$) and ferrous oxide (FeO).

The presence of $Fe_2O_3$ makes it possible to absorb UV rays and those having short wavelengths in the visible part of the spectrum. However, the presence of FeO makes it possible to absorb near IR rays and those corresponding to long wavelengths of the visible range.

Although the increase in the iron content, in the two oxide forms thereof, increases the absorption of radiation at the two ends of the visible spectrum, this effect is obtained to the detriment of the light transmission.

Hitherto various solutions have been proposed for bringing about the optimum use of the tendency of iron oxides to absorb radiation, whilst still maintaining the greatest possible light transmission. Solutions aiding the absorption of rays belonging to the near infrared range can consist of significantly modifying the glass composition or manufacturing very reduced glasses having a relatively conventional composition.

The first category of solutions can be illustrated by Japanese application JP-60-215546 and the second category of EP-B-297 404.

According to the Japanese application, glasses having the sought transmission and absorption characteristics contain at least 4% by weight BaO. This oxide, if introduced in a sufficient quantity, has the effect of displacing the absorption band due to FeO in the near infrared towards longer wavelengths. This effect can be increased by introducing $K_2O$ into the said glasses.

However, the introduction of relatively high proportions of BaO into said glasses also has negative effects. There is by no means negligible increase in the cost of the composition and the hydrolytic resistance of the glass drops. A high BaO percentage can make worse the devitrification phenomenon and make it more difficult to obtain a homogeneous glass.

The glasses described in EP-B-297 404 are conventional soda-lime-silica glasses, whose total iron content, expressed as $Fe_2O_3$, is between 0.45 and 0.65%. These glasses are produced under conditions such that at least 35% and preferably at least 50% of the total iron is in the form FeO. The thus obtained FeO content increase makes it possible to improve the absorption of the glasses in the infrared and reduce the factor $T_E$. Moreover, when a glass is produced in the presence of sulphur under reducing conditions, the latter takes on an amber colour due to the formation of chromophores resulting from the reaction between the sulphur and the ferric iron. Therefore, to avoid this, it is necessary to eliminate the sulphates in the vitrifiable mixture and, as the sulphur content in the glass is never zero, ensure that the ferric iron percentage remains low, which means that the total iron content is strictly limited.

SUMMARY OF THE INVENTION

The present invention relates to a glass composition which can be spread onto the surface of a tin bath in accordance with the float glass method, whose cost is close to that of standard float glass and which has transmission characteristics in the near infrared at least equal to those of the best known glasses.

The present invention relates to a glass composition which can be produced under oxidation-reduction conditions normally observed for a standard float glass.

The present invention also relates to a glass composition, whose characteristics such as the viscosity or hydrolytic resistance, differ only slightly from those of a standard float glass.

These aims are achieved as a result of a soda-lime-silica glass composition comprising the following constituents, whose contents are expressed as weight percentages, defined by the following limits:

$SiO_2$ 69–75%
$Al_2O_3$ 0–3%
CaO 2–10%
MgO 0–2%
$Na_2O$ 9–17%
$K_2O$ 0–8%
$Fe_2O_3$(total iron) 0.2–1.5%

These compositions can also contain fluorine, oxides of zinc, zirconium, cerium and titanium and less than 4% barium oxide, the sum of the percentages of the alkaline earth oxides remaining equal to or below 10%.

DETAILED DESCRIPTION OF THE PREFERRED EMBODIMENTS

The silica is maintained within relatively narrow limits for the following reasons:

above approximately 75% the viscosity of the glass and its tendency to devitrification increase strongly, which makes it must more difficult to melt it and cast it on a tin bath;

below 69% the hydrolytic resistance of the glass decreases very rapidly and there is also a reduction of the transmission in the visible range.

This reduction of the hydrolytic resistance of the glass can at least partly be compensated by introducing $Al_2O_3$, but the latter oxide contributes to an increase in its viscosity and to a reduction of the transmission in the visible range. Therefore, only a very limited quantity can be used.

The alkali metal oxides $Na_2O$ and $K_2O$ make it possible to facilitate the melting of the glass and adjust its viscosity at high temperatures, in order to keep it close to that of a standard glass. $K_2O$ can be used up to approximately 8%, beyond which the increases in the percentage of $K_2O$ can only essentially take place to the detriment of $Na_2O$, which can contribute to an increase in the viscosity. However, under given conditions, the presence of $K_2O$ makes it possible to increase the absorption of the glass in the infrared.

Alkaline earth oxides have a determinative function in obtaining the properties of the glasses of the present invention.

It has in fact been discovered that the limitation of the MgO percentage to 2% and preferably its elimination in the glasses according to the invention in the form of a voluntary additive, make it possible to increase their absorption capacity in the infrared. The elimination of MgO, which plays an important part with regards to the viscosity can at least partly be compensated by an increase of the $Na_2O$ content.

CaO must be limited to 10% and beyond this the tendency of the glass to devitrification increases too rapidly. BaO can be added to the compositions according to the invention in quantities below 4%.

Thus, BaO has a much smaller influence on the viscosity of the glass than MgO and CaO. Within the scope of the invention, BaO increase essentially takes place to the detriment of alkali metal oxides, MgO and particularly CaO. Therefore, any significant increase in the BaO content contributes to increasing the viscosity of the glass, particularly at low temperatures. In addition, the introduction of a high BaO percentage significantly increases the cost of the composition and the tendency to reduce the hydrolytic resistance of the glass.

Contrary to what was stated in the previously analyzed Japanese document, it is necessary to add to this that the introduction of a small amount of BaO to a glass containing little and preferably no MgO makes it possible to further increase infrared radiation absorption. Apart from respecting the above-defined limits for varying the content of each alkaline earth oxide, it is imperative for obtaining the sought transmission properties to limit the sum of the percentages of MgO, CaO and BaO to a value equal to or below 10%.

The glasses according to the invention also contain iron oxides, whose contents are expressed overall in the form $Fe_2O_3$ (total iron).

The glasses according to the invention can also contain up to 1% of other constituents supplied by the impurities of the vitrifiable starting material and/or due to the introduction of cullet into the vitrifiable mixture and/or coming from the use of refining agents ($SO_3$, Cl, $Sb_2O_3$, $As_2O_3$).

A first series of preferred glass compositions according to the invention comprises the following constituents in the indicated weight limits:

$SiO_2$ 71–75%
$Al_2O_3$ 0–3%
CaO 6–10%
$Na_2O$ 12–17%
$Fe_2O_3$ (total iron) 0.2–1.5%

These glasses are preferably deprived of MgO and are optionally deprived of $K_2O$. The term deprived is used with the meaning that these glasses can optionally contain a very small amount of the oxides in question supplied by the impurities of a vitrifiable starting material or as a result of the introduction of cullet into the vitrifiable mixture.

Another series of preferred glass compositions according to the invention comprises the following constituents in the indicated weight limits:

$SiO_2$ 69–74%
$Al_2O_3$ 0–3%
CaO 2–7%
$Na_2O$ 10–15%
$K_2O$ 2–7%
$Fe_2O_3$ 0.2–1.5%, said glasses being preferably deprived of MgO.

When the glasses according to the invention contain barium oxide, the percentage of the latter is preferably between 0.5 and 3.5% by weight.

The glasses according to the invention can also contain fluorine, preferably between 0.5 and 2% by weight thereof. Apart from its well-known action on the melting and viscosity of the glass, said constituent has a specific effect on the absorption of infrared radiation and which is added to the effect produced by the elimination of MgO and the introduction of $K_2O$ and BaO. This effect leads to a slight displacement of the maximum of the absorption band into the infrared, but in particular a straightening of the slope of said band at the end of the near visible range of the infrared.

The glasses according to the invention may also contain zinc oxide, which makes it possible to reduce the viscosity of the glass if this is necessary and contributes to increasing the hydrolytic resistance of the glass, whilst reducing its tendency to vitrification. For this reason ZnO is preferably introduced into glasses according to the invention containing a high silica percentage and/or containing no alumina. The zinc oxide can also be advantageously added to the vitrifiable mixture used for producing a reduced glass. This oxide avoids the appearance of an amber colour, which frequently occurs with such glasses. In order not to excessively increase the cost of the composition ZnO is introduced in proportions between 0.5 and 3% by weight.

The glasses according to the invention can also contain zirconium oxide. This oxide makes it possible to stabilize the glass and improve its chemical resistance and in particular its hydrolytic resistance. This oxide is preferably introduced into the glasses according to the invention containing little or no alumina in their contents, which can reach 1.5% by weight.

The glasses according to the invention can also contain cerium oxide in order to increase the absorption of ultraviolet rays. The glasses according to the invention can contain up to 1.5% and preferably 0.3–0.8% by weight of $Ce_2O_3$.

The glasses according to the invention may also contain titanium oxide, the content of the latter being up to 1% by weight. This oxide, like $Ce_2O_3$, makes it possible to increase the absorption of ultraviolet rays. When these two oxides are present in the glasses according to the invention, the content of $TiO_2$ makes it possible to reduce the content of $Ce_2O_3$, which is expensive. Generally the sum of the two oxides does not exceed 1.2% by weight.

The glasses according to the invention can be produced under conditions making it possible to achieve the desired redox level. Thus, the glasses according to the invention can be produced using known refining agents, such as sulphates, their redox level being below 0.35 and generally between 0.2 and 0.3. The glasses according to the invention with the lowest iron levels can also be produced under the conditions e.g. described in EP-B-297 404 and can have a redox level above 0.4 or 0.5. The redox level of the glasses according to the invention remains below 0.8.

The cumulative effect of the different constituents of the glasses according to the invention normally leads to a displacement towards the longer wavelengths of the maximum of the absorption band due to FeO in the near infrared. For the glasses according to the invention, said maximum is above approximately 1100 nanometres.

This displacement, which is usually accompanied by an increase in the intensity of the absorption band, is obtained whilst maintaining a particularly high total light transmission. Therefore, the total energy and light transmission factors of the glasses according to the invention are such that the ratio $TL_A/T_E$ is generally equal to or above 1.65 and in most cases equal to or above 1.70.

With a thickness of 3.85 millimetres, the glasses according to the invention have a factor $TL_A$ of at least 71%. The glasses according to the invention have, with a thickness of 3.85 millimetres, a transmission in the infrared range generally below 30%.

The total light transmission factor and illuminant A ($TL_A$) and the total energy transmission factor ($T_E$), as well as the transmission in the infrared ($T_{IR}$) were measured according to the PARRY MOON MASS 2 method. The transmission in the ultraviolet was determined according to the method defined in standard ISO 9050.

The advantages of the glasses according to the invention will become more apparent by means of a series of samples referred to hereinafter.

Several series of glasses were produced from theoretical compositions appearing in the attached table. All these glasses were produced under substantially identical redox conditions, between approximately 0.28 and approximately 0.30.

This table also indicates the values of the following properties:

the total energy transmission factor $T_E$ (71) is evaluated by calculation for an identical total light transmission factor $TL_A$ of 71%, the transmission values in the ultraviolet ($T_{UV}$) and in the infrared ($T_{IR}$) are measured for a thickness of 3.85 mm, $\lambda$ (FeO) corresponds to the wavelength of the maximum of the absorption band in the infrared due to FeO, the hydrolytic resistance of the glasses is evaluated by the D.G.G. method. This method consists of immersing 10 grams of crushed glass, whose grain size is between 360 and 400 micrometres, in 100 millilitres of water kept at boiling for 5 hours. After rapid cooling the solution is filtered and evaporation to dryness takes place of a given filtrate volume. The weight of the dry matter obtained makes it possible to calculate the glass quantity dissolved in the water. This quantity is expressed in milligrams per gram of remaining glass. Glasses of examples 1, 5 and 9 are used as references.

The first is a standard glass containing magnesia. Its total energy transmission factor corresponding to a total transmission factor of 71% is relatively high and leads to a $TL_A:T_E$ ratio of 1.53.

Compared with this first example, the glasses of examples 2, 3 and 4, which are deprived of MgO, illustrate part of the glasses according to the invention. These glasses, which contain neither potassium, nor barium and which are produced under the same redox conditions as the glass of example 1, compared with the latter have a much lower factor $T_E$ for the same factor $TL_A$. This is due to an increase in the intensity of the absorption band in the infrared due to FeO and to a consideration displacement of the maximum of said band towards longer wavelengths, the observed displacement exceeding 100 nanometres.

The glasses of examples 6–8 illustrate the glasses according to the invention containing potassium and deprived both of MgO and BaO. These glasses can be compared with that of example 5, which is derived from that of example 1 substituting 5% of $K_2O$ for part of the content of $Na_2O$. This substitution led to a reduction of the factor $T_E$ correlative of the displacement of the maximum of the absorption band into the infrared caused by the introduction of $K_2O$.

In the glasses according to the invention, the cumulative effect of the absence of MgO and the presence of the same percentage of $K_2O$ permits a substantial displacement of the maximum of the band. This brings about a remarkable reduction of the factor $T_E$. The influence which can be attributed to potassium alone in this phenomenon can be estimated by comparing the glasses of examples 3 and 8.

The glasses of examples 10–15 illustrate the glasses according to the invention containing simultaneously $K_2O$ and BaO, said glasses being deprived of MgO. The presence of BaO can once again permit a reduction of the factor $T_E$ linked with the displacement of the maximum of the absorption band and the increase in the intensity of said band.

This phenomenon is illustrated by a comparison of the glasses of examples 13 and 14 with that of example 7.

The glasses of examples 10–14 can also be compared with that of example 9, which is outside the invention. The latter differs from the previously defined glasses by a much higher BaO content. Apart from the fact that such a content leads to no supplementary reduction of the factor $T_E$, it can be seen that this glass has a higher transmission in the infrared and a significant reduction in its hydrolytic resistance.

The glasses of examples 16–19 illustrate the glasses according to the invention containing $TiO_2$ and/or $Ce_2O_3$. These glasses are deprived of MgO, BaO and $K_2O$ and, for a total light transmission of 71%, they are characterized by a particularly remarkable absorption both in the infrared and in the ultraviolet.

The glass of example 20 illustrates the influence of fluorine in a glass containing $K_2O$ and deprived of MgO and BaO. It is more particularly characterized by an extremely marked absorption in the infrared.

In general terms, the glasses according to the invention have a hydrolytic resistance which, measured by the D.G.G. method, leads to a residue below 75 milligrams and in most cases below 60 milligrams. This resistance is of the same order of magnitude as that of conventional float glasses, which have a D.G.G. of approximately 30–40 milligrams. The glasses according to the invention also have a viscosity curve very close to that of a standard float glass.

Thus, the temperatures corresponding to log $\psi$=4 and log $\psi$=2 are approximately 1020° C. and 1440° C. respectively for a standard float glass. For most of the glasses according to the invention, these same temperatures respectively range between 980° and 1050° C. and between 1400° and 1475° C.

The glasses according to the invention are compatible with the standard production procedures for flat glass, provided that, for certain glasses, they are produced in furnaces equipped with electrodes. The thickness of the glass tape obtained by spreading molten glass onto a tin bath can vary between 0.8 and 10 mm.

The glazing obtained by cutting the glass tape can subsequently undergo a bending operation, particularly if it has to be fitted in a motor vehicle.

For the production of windscreens or side windows, the chosen glazing is initially cut in a glass tape with a thickness generally varying between 3 and 5 mm. With these thicknesses, the glasses according to the invention ensure a good thermal comfort.

Like other glazings, the glazings obtained from the glasses according to the invention can undergo beforehand surface treatments or can e.g. be associated with an organic coating, such as a film based on polyurethanes having antilacerating properties or a film ensuring tight sealing in the case of breakage. It can be locally coated with a coating such as an enamel coating.

The glazings according to the invention can be coated with at least one metal oxide layer obtained by high temperature chemical deposition using pyrolysis or chemical vapour deposition or vacuum deposition methods.

TABLE

|  |  | Ex. 1 | Ex. 2 | Ex. 3 | Ex. 4 | Ex. 5 |
|---|---|---|---|---|---|---|
| $SiO_2$ | (%) | 71.2 | 74.5 | 73 | 73.0 | 71.2 |
| $Al_2O_3$ | (%) | 0.6 | 0.6 | 0.6 | 0.6 | 0.6 |
| CaO | (%) | 8.6 | 9.0 | 9.0 | 8.6 | 8.6 |
| MgO | (%) | 3.8 | — | — | — | 3.8 |
| $Na_2O$ | (%) | 14.2 | 14.9 | 16.2 | 16.2 | 9.2 |
| $K_2O$ | (%) | — | — | — | — | 5 |
| BaO | (%) | — | — | — | — | — |
| $Fe_2O_3$ | (%) | 0.56 | 0.56 | 0.87 | 0.56 | 0.56 |
| $SO_3$ | (%) | 0.3 | 0.3 | 0.3 | 0.3 | 0.3 |
| $T_{E(VI)}$ (71) | (%) | 46.3 | 40.3 | 40.8 | 40.0 | 43.2 |
| $T_{UV}$ | (%) | 45.4 | 50.2 | 35.6 | 49.8 | 47.3 |
| $T_{IR}$ | (%) | 32.7 | 27.4 | 14.5 | 27 | 33.4 |
| λFeO | (nm) | 1040 | 1160 | 1160 | 1160 | 1080 |
| DGG | (mg) | 35 | — | 32 | 33 | — |
| Temp.logη = 2 | (°C.) | 1440 | 1460 | 1460 | 1445 | — |
| Temp.logη = 4 | (°C.) | 1025 | 1025 | 1025 | 1010 | — |
|  |  | Ex. 6 | Ex. 7 | Ex. 8 | Ex. 9 | Ex. 10 |
| $SiO_2$ | (%) | 71.2 | 72.7 | 72.7 | 71.2 | 73 |
| $Al_2O_3$ | (%) | 0.6 | 0.6 | 0.6 | — | 0.6 |
| CaO | (%) | 7.9 | 6.3 | 6.3 | 2 | 5.3 |
| MgO | (%) | — | — | — | — | — |
| $Na_2O$ | (%) | 14.2 | 14.2 | 14.2 | 14.2 | 14.2 |
| $K_2O$ | (%) | 5 | 5 | 5 | 5 | 5 |
| BaO | (%) | — | — | — | 6 | 1 |
| $Fe_2O_3$ | (%) | 0.56 | 0.56 | 0.91 | 0.56 | 0.56 |
| $SO_3$ | (%) | 0.3 | 0.3 | 0.3 | 0.3 | 0.3 |
| $T_{E(VI)}$ (71) | (%) | 40.7 | 39.7 | 39.1 | 39.6 | 39.1 |
| $T_{UV}$ | (%) | 48.9 | 50.6 | 39.9 | 50.2 | 53.2 |
| $T_{IR}$ | (%) | 24.3 | 27.9 | 9.8 | 36.2 | 25.8 |
| λFeO | (nm) | 1130 | 1160 | 1150 | 1160 | 1160 |
| DGG | (mg) | 39 | 30 | 61 | 113 | 54 |
| Temp.logη = 2 | (°C.) | 1425 | 1450 | 1450 | 1390 | 1460 |
| Temp.logη = 4 | (°C.) | 1000 | 1010 | 1010 | 1040 | 1020 |
|  |  | Ex. 11 | Ex. 12 | Ex. 13 | Ex. 14 | Ex. 15 |
| $SiO_2$ | (%) | 73.3 | 72.1 | 71.2 | 71.2 | 71.2 |
| $Al_2O_3$ | (%) | 0.6 | 0.6 | — | — | — |
| CaO | (%) | 5.6 | 5.1 | 6 | 5 | 4.5 |
| MgO | (%) | — | — | — | — | — |
| $Na_2O$ | (%) | 13.2 | 14.2 | 14.2 | 14.2 | 14.2 |
| $K_2O$ | (%) | 5 | 5 | 5 | 5 | 5 |
| BaO | (%) | 1.4 | 2 | 2.5 | 3.5 | 3.5 |
| $Fe_2O_3$ | (%) | 0.56 | 0.56 | 0.56 | 0.56 | 0.56 |
| $ZrO_2$ | (%) | — | — | — | — | 0.5 |
| $SO_3$ | (%) | 0.3 | 0.3 | 0.3 | 0.3 | 0.3 |
| $T_E$ (71) | (%) | 39.5 | 39.5 | 38.4 | 38.5 | 39 |
| $T_{UV}$ | (%) | 52.1 | 53.1 | 52.7 | 53.2 | 41 |
| $T_{IR}$ | (%) | 25.4 | 28.2 | 18.4 | 23.7 | 24 |
| λFeO | (nm) | 1180 | 1160 | 1160 | 1140 | 1120 |
| DGG | (mg) | 43 | 59 | 48 | 60 | 70 |
| Temp.logη = 2 | (°C.) | 1472 | 1450 | 1405 | 1395 | — |
| Temp.logη = 4 | (°C.) | 1025 | 1020 | 1020 | 1035 | — |
|  |  | Ex. 16 | Ex. 17 | Ex. 18 | Ex. 19 | Ex. 20 |
| $SiO_2$ | (%) | 73.5 | 73.5 | 73.5 | 73.5 | 71.2 |
| $Al_2O_3$ | (%) | 0.62 | 0.62 | 0.62 | 0.62 | 0.6 |
| CaO | (%) | 8.2 | 8.2 | 8.2 | 8.2 | 6.4 |
| MgO | (%) | — | — | — | — | — |
| $Na_2O$ | (%) | 14.9 | 14.9 | 14.9 | 14.9 | 14.2 |
| $K_2O$ | (%) | — | — | — | — | 5 |
| $Fe_2O_3$ | (%) | 0.87 | 1.0 | 1.0 | 1.0 | 0.91 |

TABLE-continued

| $Ce_2O_3$ | (%) | — | 1.0 | 0.8 | 0.4 | — |
|---|---|---|---|---|---|---|
| $TiO_2$ | (%) | 0.5 | — | 0.2 | 0.6 | — |
| F | (%) | — | — | — | — | 1 |
| $SO_3$ | (%) | 0.4 | 0.3 | 0.3 | 0.3 | 0.3 |
| $T_{E (VI)}$ (71) | (%) | 40.45 | 40.85 | 40.65 | 41.15 | 39.65 |
| $T_{IR}$ | (%) | 22 | 13.6 | 13.5 | 12.4 | 25 |
| $T_{IR}$ | (%) | 17 | 15.4 | 14.6 | 12.1 | 11.2 |
| λFeO | (nm) | 1160 | 1160 | 1120 | 1160 | 1180 |
| DGG | (mg) | 30 | 32 | 32 | — | 46.5 |
| Temp.logη = 2 | (°C.) | 1460 | 1460 | 1460 | 1460 | — |
| Temp.logη = 4 | (°C.) | 1025 | 1025 | 1025 | 1025 | — |

I claim:

1. A soda-lime-silica glass composition for use in the production of glazings, consisting of the following constituents of a vitrifiable starting material whose contents in the glass are expressed as weight percentages:

$SiO_2$ 69 to 75%
   $Al_2O_3$ 0 to 3%
   CaO 2 to 10%
   $Na_2O$ 9 to 17%
   $K_2O$ 0 to 8%
   iron oxide ($FeO/Fe_2O_3$) 0.2 to 1.5% the composition optionally containing fluorine, oxides of zinc, zirconium, titanium and barium, with the content of BaO being no more than 3.5%, the sum of the percentages of the alkaline earth oxides being equal to or less than 10%, said glass having an absorption band in the infrared whose maximum is at a wavelength higher than approximately 1100 nm and said glass containing up to 1% of other constituents provided by the impurities of the vitrifiable starting material, by the introduction of cullet into the vitrifiable mixture, by the use of refining agents, or combinations thereof.

2. The composition of claim 1, wherein the composition consists of:

$SiO_2$ 71 to 75%
   $Al_2O_3$ 0 to 3%
   CaO 6 to 10%
   $Na_2O$ 12 to 17%
   iron oxide ($FeO/Fe_2O_3$) 0.2 to 1.5%.

3. The composition according to claim 1, wherein the composition does not contain $K_2O$.

4. The composition according to claim 1, wherein the composition consists of $SiO_2$ 69 to 74%
   $Al_2O_3$ 0 to 3%
   CaO 2 to 7%
   $Na_2O$ 10 to 15%
   $K_2O$ 2 to 7%
   iron oxide ($FeO/Fe_2O_3$) 0.2 to 1.5%.

5. The composition according to claim 1, which contains from 0.5 to 3.5% by weight BaO.

6. The composition according to claim 1, wherein the content of fluorine ranges from 0.5–2% by weight.

7. The composition according to claim 1, wherein the content of ZnO ranges from 0.5–3% by weight.

8. The composition according to claim 1, wherein the content of $ZrO_2$ ranges up to 1.5% by weight.

9. The composition according to claim 1, wherein the content of $TiO_2$ ranges up to 1% by weight.

10. The composition according to claim 1, wherein the ratio of $FeO/Fe_2O_3$ of the iron oxide component is less than 0.8.

11. A glazing, comprising at least one, glass sheet whose chemical composition is defined by claim 1, said sheet having a thickness between 0.8 and 10 mm.

12. The glazing according to claim 1, wherein said glass sheet has a factor $TL_A$ of at least 71% at a thickness of 3.85 mm.

13. The glazing according to claim 12, wherein said at least one glass sheet has a factor $TL_A$ and a factor $T_E$ such that the ratio $TL_A/T_E$ is greater than or equal to 1.65 for a sheet having a thickness of 3.85 mm.

14. The glazing according to claim 11, wherein said at least one glass sheet has a transmission in the infrared below 30% in the case of a sheet of a thickness of 3.85 mm.

15. The glazing according to claim 11, wherein said at least one glass sheet has a hydrolytic resistance, measured according to the D.G.G. method such that the residue after attack is less than about 75 milligrams.

16. A soda-lime-silica glass composition, consisting of a vitrifiable starting material having the following constituents whose contents in the glass are expressed as weight percentages:

$SiO_2$ 69 to 75%
$Al_2O_3$ 0 to 3%
CaO 2 to 10%
$Na_2O$ 9 to 17%
$K_2O$ 0 to 8%
iron oxide ($FeO/Fe_2O_3$) 0.2 to 1.5% the composition optionally containing titanium oxide, zinc oxide or zirconium oxide or up to 1.5% by weight $Ce_2O_3$.

17. The composition according to claim 16, wherein the content of $Ce_2O_3$ ranges from 0.3–0.8% by weight.

18. The composition according to claim 16, wherein the content of the sum of oxides of cerium and titanium ($Ce_2O_3$+ $TiO_2$) is not greater than 1.2% by weight.

19. A soda-lime-silica glass composition for use in the production of glazings, consisting of the following constituents of a vitrifiable starting material whose contents in the glass are expressed as weight percentages:

$SiO_2$ 69 to 75%
$Al_2O_3$ 0 to 3%
CaO 2 to 10%
MgO 0 to 2%
$Na_2O$ 9 to 17%
$K_2O$ 0 to 8%
iron oxide ($FeO/Fe_2O_3$) 0.2 to 1.5% the composition optionally containing (i) fluorine, and (ii) oxides of zinc, zirconium and titanium, the sum of the percentages of the alkaline earth oxides being equal to or less than 10%, said glass having an absorption band in the infrared whose maximum is at a wavelength higher than approximately 1100 nm and said glass containing up to 1% of other constituents provided by the impurities of the vitrifiable starting material, by the introduction of cullet into the vitrifiable mixture, by the use of refining agents, or combinations thereof.

* * * * *

UNITED STATES PATENT AND TRADEMARK OFFICE
CERTIFICATE OF CORRECTION

PATENT NO. : 5,830,814
DATED : November 3, 1998
INVENTOR(S) : Jean-Marie Combes

It is certified that error appears in the above-identified patent and that said Letters Patent is hereby corrected as shown below:

Column 8,
Lines 25, 43 and 54, delete "iron oxide ($FeOFe_2O_3$) 0.2 to 1.5%" and insert -- $Fe_2O_3$ (total iron) 0.2 to 1.5% --.

Column 9,
Line 27, delete "iron oxide ($FeO/Fe_2O_3$) 0.2 to 1.5%" and insert -- $Fe_2O_3$ (total iron) 0.2 to 1.5% --.

Column 10,
Line 18, "iron oxide ($FeO/Fe_2O_3$) 0.2 to 1.5%" and insert -- $Fe_2O_3$ (total iron) 0.2 to 1.5% --.

Signed and Sealed this

Sixteenth Day of July, 2002

Attest:

JAMES E. ROGAN
Attesting Officer
Director of the United States Patent and Trademark Office